(12) United States Patent
DeChard

(10) Patent No.: US 9,630,860 B2
(45) Date of Patent: Apr. 25, 2017

(54) WASTE AND/OR HAZARDOUS LIQUID CONTAINMENT AND COLLECTION SYSTEM

(71) Applicant: Albert DeChard, Tampa, FL (US)

(72) Inventor: Albert DeChard, Tampa, FL (US)

( * ) Notice: Subject to any disclaimer, the term of this patent is extended or adjusted under 35 U.S.C. 154(b) by 0 days.

(21) Appl. No.: 14/615,711

(22) Filed: Feb. 6, 2015

(65) Prior Publication Data

US 2016/0228793 A1   Aug. 11, 2016

(51) Int. Cl.
| | | |
|---|---|---|
| *C02F 1/40* | (2006.01) | |
| *B08B 17/02* | (2006.01) | |
| *B01D 17/02* | (2006.01) | |
| *B01D 17/00* | (2006.01) | |
| *E03F 5/04* | (2006.01) | |
| *C02F 1/00* | (2006.01) | |
| *C02F 101/32* | (2006.01) | |
| *C02F 103/44* | (2006.01) | |

(52) U.S. Cl.
CPC ............ *C02F 1/40* (2013.01); *B01D 17/0214* (2013.01); *B01D 17/10* (2013.01); *B08B 17/025* (2013.01); *C02F 1/001* (2013.01); *C02F 2001/007* (2013.01); *C02F 2101/32* (2013.01); *C02F 2103/44* (2013.01); *E03F 5/04* (2013.01); *E03F 5/0407* (2013.01)

(58) Field of Classification Search
CPC ...... B01D 17/02; B01D 17/045; B01D 17/04; B08B 13/00; C02F 1/001; C02F 1/40; C02F 2001/007; C02F 2103/44; E03F 1/00; E03F 5/0403; E03F 5/0404; E03F 5/0407; E03F 5/04; E03F 5/14; E03F 5/16

USPC .......... 210/163, 164, 170.01, 170.03, 747.1, 210/747.3
See application file for complete search history.

(56) References Cited

U.S. PATENT DOCUMENTS

| | | | | | |
|---|---|---|---|---|---|
| 1,764,756 | A | * | 6/1930 | Slee | ......... A47L 13/62 5/419 |
| 3,555,224 | A | * | 1/1971 | Frind | ...... H01H 9/342 218/149 |

(Continued)

FOREIGN PATENT DOCUMENTS

GB           2483690 A  *  3/2012  ............... E01C 3/06

OTHER PUBLICATIONS

Definition of Whereas by Merriam-Webster, http://www.merriam-webster.com/dictionary/whereas No Date.*

*Primary Examiner* — Krishnan S Menon
*Assistant Examiner* — Liam Royce
(74) *Attorney, Agent, or Firm* — Larson & Larson, P.A.; Frank Liebenow; Patrick Reid

(57) ABSTRACT

A waste water and hazardous chemical containment and collection system includes a substantially planar, non-porous lower layer. A lower corrugated plate layer rests upon the planar, non-porous lower layer and an upper corrugated plate layer rests upon the lower corrugated plate layer. An upper layer that has several holes for the passage of fluids rests upon the upper corrugated plate layer. The overall length and width of the lower corrugated plate layer, the upper corrugated plate layer, and the upper layer are substantially equal. Fluids enter the system through the holes and some oils from the fluids collect within netting of the lower corrugated plate layer and the upper corrugated plate layer for later collection.

10 Claims, 5 Drawing Sheets

(56) References Cited

U.S. PATENT DOCUMENTS

| | | | | |
|---|---|---|---|---|
| 5,221,570 A | * | 6/1993 | Gokcen | B32B 27/32 |
| | | | | 156/244.11 |
| 5,391,295 A | * | 2/1995 | Wilcox | E03F 5/04 |
| | | | | 210/165 |
| 5,411,665 A | * | 5/1995 | Scraggs | B01D 17/00 |
| | | | | 210/610 |
| 5,738,139 A | * | 4/1998 | DeChard | E03F 1/00 |
| | | | | 137/312 |
| 7,290,558 B2 | | 11/2007 | DeChard et al. | |
| 8,109,696 B2 | * | 2/2012 | Maggioni | E02D 17/202 |
| | | | | 405/302.7 |
| 2005/0025582 A1 | * | 2/2005 | Ianniello | E02B 11/005 |
| | | | | 405/302.4 |
| 2007/0044839 A1 | * | 3/2007 | DeChard | A47K 3/286 |
| | | | | 137/312 |

* cited by examiner

WASTE AND/OR HAZARDOUS LIQUID CONTAINMENT AND COLLECTION SYSTEM

FIELD

The present invention relates to hazardous and/or waste liquid collection and containment. More particularly, it relates to a modular and mobile cleaning system for capturing, containing and collecting hazardous liquids and/or waste water resulting from cleaning of vehicles.

BACKGROUND

Hazardous liquid and waste water collection is known in the prior art. Due to rising concerns that the environment is becoming polluted at an alarming rate and the mandate of the federal Clean Water Act by, governments, both State and Federal, and those in other countries have begun mandating that water runoff from many vehicle washing procedures be contained and collected for proper disposable to avoid further contamination of the environment. For example, the simple process of cleaning a piece of machinery in which oils are separated from the machinery must now be cleaned, in many locales, in a controlled rinsing facility or shower system that collects and contains the water used during the cleaning procedure. The waste water is generally not permitted to simply enter the sewer system or run off into the underground aquifer or nearest body of water. In many locations, the washing of vehicles such as trucks and automobiles requires that the rinse water be captured, contained and disposed of properly.

Other cleaning problems occur with hazardous liquid and waste water containment and collection. In particular, it is possible for businesses, public facilities and land areas to be exposed to or infected with deadly biological or chemical substances that are extremely hazardous to remove. During an exemplary cleaning procedure, the people involved must wear protective suits. When finished in the cleaning operation, the protective wear must be thoroughly cleansed before being removed. However, it is not permitted to allow the rinse water to simply run off and into ground or sewer.

U.S. Pat. No. 7,290,558 to DeChard et al, which is hereby incorporated by reference, shows a mobile waste and containment system that lacks multiple layers of membranes as will be described.

What is needed is a system that will collect contaminated liquids (e.g. water and other soluble or insoluble material) and separate the undesirable materials from the liquid (e.g., water) for proper disposal of the undesirable materials.

SUMMARY

In one embodiment, a waste water and hazardous chemical containment and collection system is disclosed including a substantially planar, non-porous lower layer. A lower plate layer rests upon the planar, non-porous lower layer and an upper plate layer rests upon the lower plate layer. An upper layer that has several holes for the passage of fluids rests upon the upper plate layer. The overall length and width of the lower plate layer, the upper plate layer, and the upper layer are substantially equal. Fluids enter the system through the holes and some oils from the fluids collect within netting of the lower plate layer and the upper plate layer for later collection.

In another embodiment, a method of treating waste water is disclosed including passing the waste water through holes in an upper layer, thereby filtering out larger particles from the waste water then flowing the waste water over two plate layers. The two plate layers are set over a non-porous layer, thereby capturing oils suspended in the waste water within netting of the plate layers as per the nature of Stokes' Law. Waste water that now has a lower amount of oils drains from the non-porous layer.

In another embodiment, a waste water and hazardous chemical containment and collection system is disclosed including a substantially planar, non-porous lower layer having a drain, a lower plate layer resting upon the planar, non-porous lower layer, upper plate layer resting upon the lower plate layer, an upper layer having a plurality of holes for the passage of fluids, and walls surrounding the lower plate layer, the upper plate layer, and the upper layer. The overall length and width of the lower plate layer, the upper plate layer, and the upper layer are substantially equal (and surrounded by the walls).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
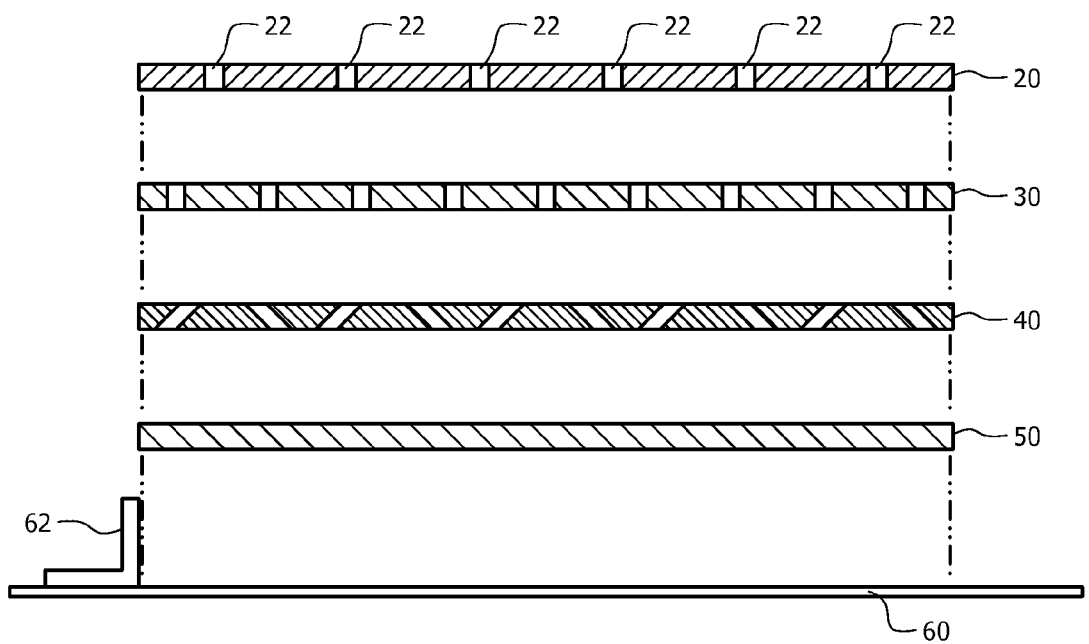
FIG. 1 illustrates a cross-sectional view of a separation portion of a waste and/or hazardous liquid containment and collection system.

Reference will now be made in detail to the presently preferred embodiments of the invention, examples of which are illustrated in the accompanying drawings. Throughout the following detailed description, the same reference numerals refer to the same elements in all figures.

Figure 2:
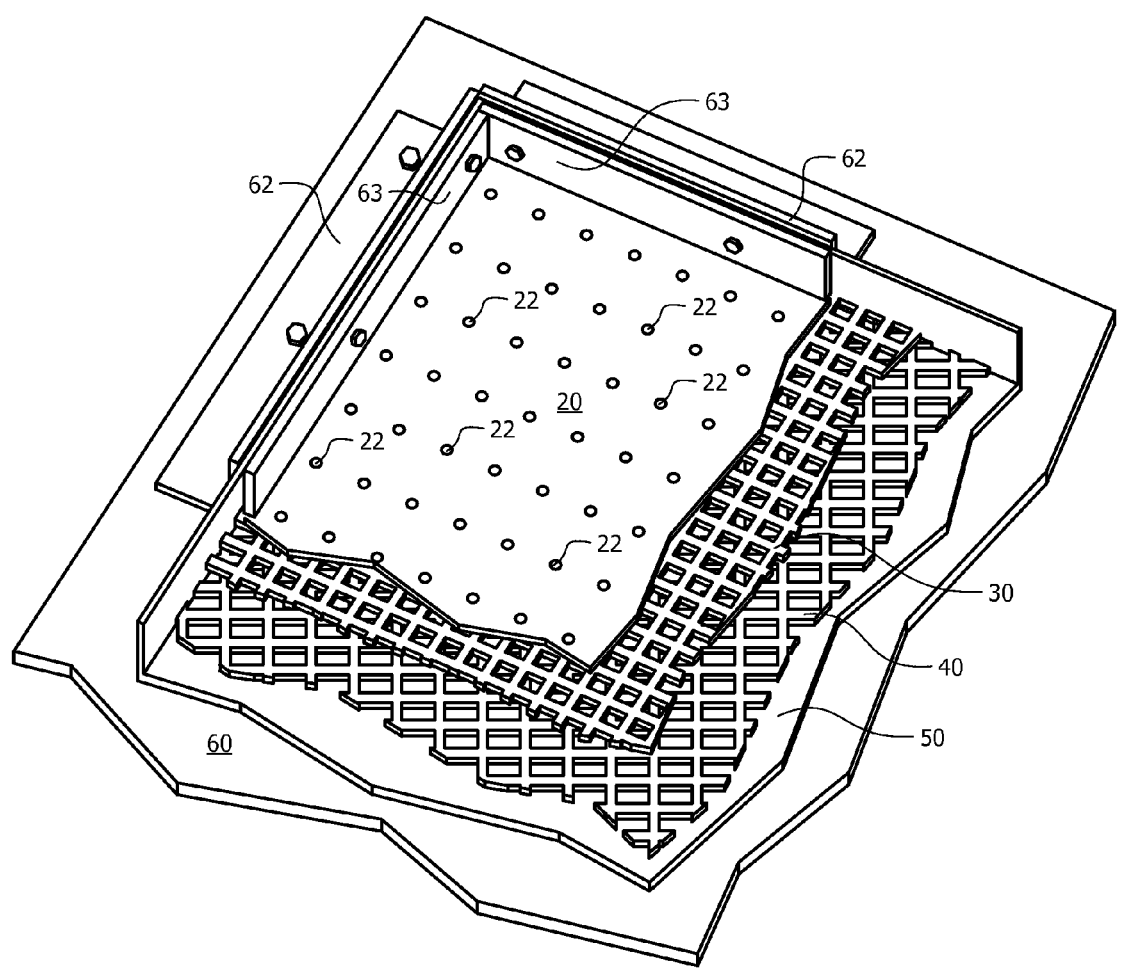
FIG. 2 illustrates a cut-away view of the separation portion of the waste and/or hazardous liquid containment and collection system.

Referring to FIGS. 1 and 2, cross-sectional and cut-away views of a separation portion of a waste and/or hazardous liquid containment and collection system are shown. Although shown in use for vehicle cleaning, the system disclose is capable of separating and proper disposal of liquids from many different applications and is not limited to washing vehicles.

In the process of washing machinery such as vehicles, various chemicals and oils are dislodged from the machinery or vehicles such as gasoline, oils, salts, car wax, tar, etc. Many municipalities prohibit drain water from machinery cleaning or car washes to enter the sewerage and/or drain water system, as these chemicals and oils would then find their way to rivers, streams, and other bodies of water, adding pollutants to such. On the other hand, it is desirable by many to have a clean vehicle, especially in geographies where ice and snow removal include using salts to melt the ice and snow being that such salts are corrosive in nature. Many people like to have clean vehicles and, to enhance the salability of vehicles; automobile dealerships often wash the entire inventory of vehicles on a periodic interval to assure that the fleet of vehicles is appealing to potential buyers.

Many people wash their vehicles at home, in their driveway, using a garden hose and bucket, releasing small amounts of pollutants into the storm drain system, which eventually leads to the above mentioned bodies of water. Many others wash their vehicles in car wash facilities which typically have bays equipped with a high pressure source of water/soap and a drain to wash away excess water and dirt. Washing of vehicles in car wash facilities is preferred, in that, it is more cost-effective to process the contaminated water from the washing process than processing the contaminated water at everybody's home.

In addition to cleaning of the waste water, some localities with limited average rainfall and many localities during drought conditions, prohibit washing of vehicles at homes and offices. In such, car washing facilities are required to recycle water so as to use as little as possible. As one could imagine, it is not good to wash a vehicle with unfiltered water from previous washed vehicles. Using such contaminated water results in a dirty vehicle, even after cleaning. Using contaminated water also results in fine grain grit being power-sprayed onto the vehicle which, besides slowly removing waxes and paint from the vehicle, this grit also clogs the high-pressure spray nozzle, requiring frequent cleaning or replacement of the nozzle.

Figure 4:
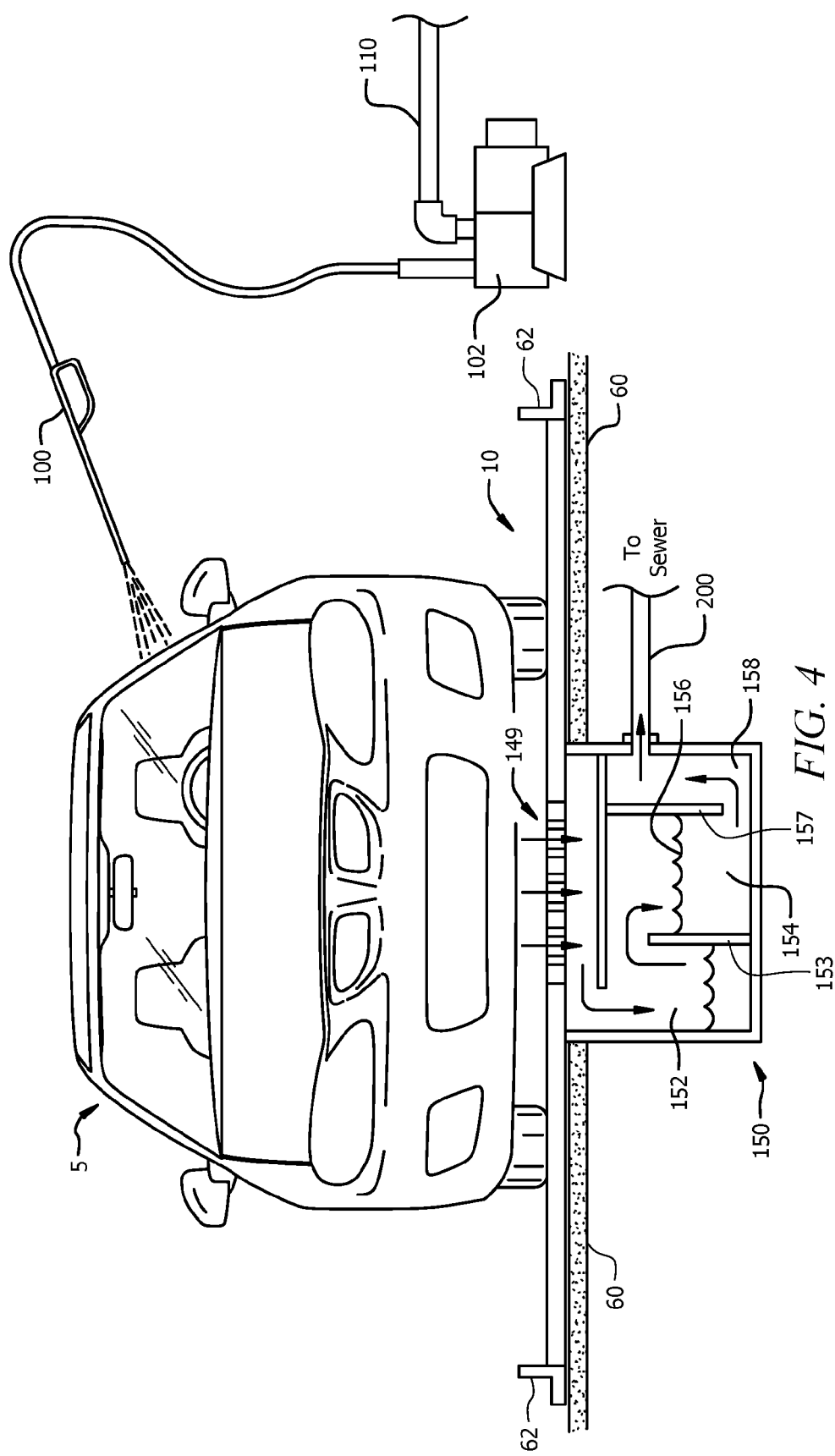
FIG. 4 illustrates a second plan view of the waste and/or hazardous liquid containment and collection system.
Figure 5:
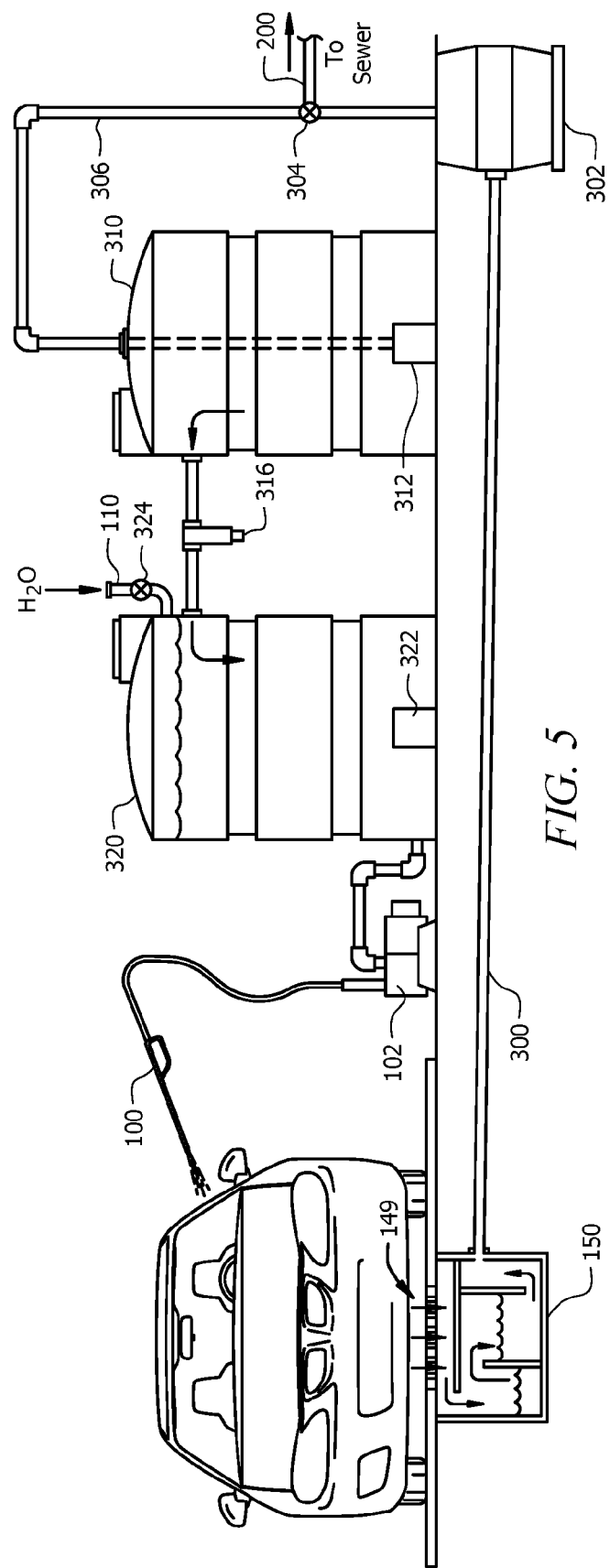
FIG. 5 illustrates a third plan view of the waste and/or hazardous liquid containment and collection system.

To facilitate recycling of the waste water from the above described situations, the disclosed waste and/or hazardous liquid containment and collection system includes one or more separation and/or filtering portions, each independent of the other and useful with or without the others. The first such separation and/or filter section is shown in FIG. 1. This separation portion includes several layers 20/30/40/50. The permeable layers 20/30/40 are held atop the impermeable layer 50 by wall members 62 that prevent the contaminated liquids from spilling out from the sides of the layers 20/30/40/50. Although not required, it is anticipated that, in some embodiments, the wall members 62 are fastened to the ground surface 60 (e.g., a cement slab 60). In some embodiments, plates 63 are fastened to the wall members 62 to secure the layers 20/30/40/50 in place. In a preferred embodiment, the bottom, impervious layer 50 includes drainage for recycling runoff as shown in FIGS. 4 and 5. Also, although not required, in this preferred embodiment, it is also preferred that there is a slow pitch or incline angled downward with respect to gravity, converging at the drain area 149 (see FIGS. 4 and 5).

As contaminated fluids with solids (e.g. water, solids, and pollutants) fall onto the upper layer 20, the contaminated fluids pass through a plurality of holes 22 in the upper layer 20, filtering out large debris such as stones, paper, etc.

The next two layers 30/40 are made of plate technology, layer 30 set over layer 40. In a preferred embodiment, the upper plate layer 30 is offset at an angle with respect to the lower plate layer 40. By arranging the plate layers 30/40 in parallel, as shown, on top of the impervious layer 50, contaminated water with suspended oils must traverse the plate layers 30/40 to reach the drain. As the contaminated water with suspended oils traverses the plate layers 30/40, oil droplets (the leading pollutant) are forced to increase in size, thereby speeding separation from other liquids such as water. After some number of uses, the upper layer 20 is lifted and the oil is vacuumed out of the plate layers 30/40 for proper disposal and recycling.

As an example, the plate layers 30/40 are textured geomembranes made by co-extruding textured, high density polyethylene providing chemical resistance and sufficient load carrying abilities to support the weight of most vehicles.

Any impervious layer 50 is anticipated such as a reinforced polypropylene 50 as known for use as a liner for containment ponds.

Figure 3:
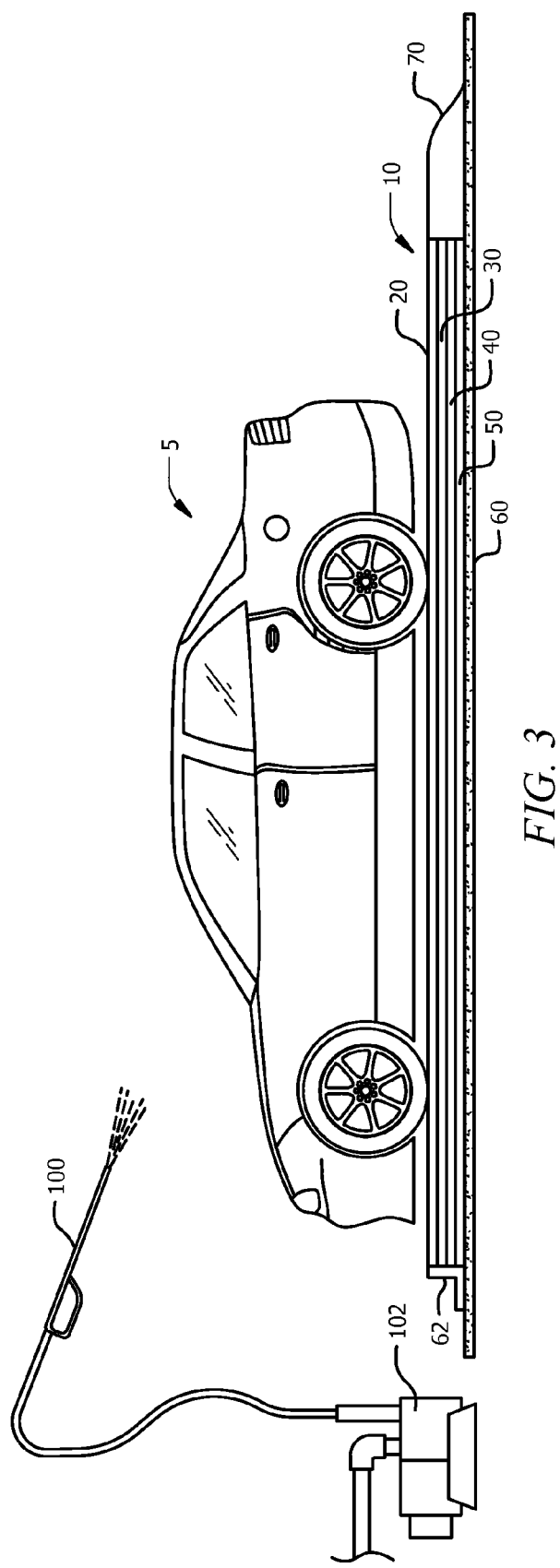
FIG. 3 illustrates a plan view of the waste and/or hazardous liquid containment and collection system.

Referring to FIG. 3, a plan view of the waste and/or hazardous liquid containment and collection system 10 is shown. In this example, a ramp 70 is provided to ease driving of a vehicle 5 onto the collection system 10. For completeness, a high-pressure pump 102 and a washing wand 100 are shown. In operation, dirt and debris are dislodged from the vehicle 5 by the high-pressure water from the washing wand 100 and the now contaminated water, for example having dirt and oils suspended there within, fall onto the upper layer 20 of the collection system 10. The holes 22 in the upper layer 20 filter out large particles such as stones and also reduce splashing of the contaminated water onto the remaining layers 30/40/50. As the contaminated water flows over the plate layers 30/40, any oil suspended in the water beads into droplets that further combine with existing droplets of oil and remains within the netting of the plate layers 30/40 as per the nature of Stokes' Law. In such, the sedimentation of the droplets of oil separates the oil from the water. The water (still contaminated with other pollutants) flows to a low spot of the collection system 10 while most of the oil remains within the plate layers 30/40. As in FIGS. 4 and 5, a drain 149 at the low area of the impervious layer 50 permits collection of the water (with some contaminates). After some number of uses, the upper layer 20 is lifted and the oil is vacuumed out of the plate layers 30/40 for proper disposal and recycling.

Referring to FIGS. 4 and 5, alternate installations of the waste and/or hazardous liquid containment and collection system 10 are shown. In these examples of installations of the collection system 10, after removal of the oils by the plate layers 30/40 per the above explanation, the run-off, dirty water falls through a drainage area 149 in the impermeable layer 50. Although not required, it is preferred that the layers 20/30/40/50 are slightly pitched towards the drainage area 149 to facilitate a slow flow of fluid towards the drainage area 149.

After falling through the drainage area 149, the run-off, dirty water is further processed by separation tank 150. In this exemplary separation tank 150, the dirty water enters into a first compartment. As the first compartment fills, the now cleaner water flows over a weir 153 into a second compartment 154. In such, contaminates that have a higher specific gravity than water (e.g., sand, metal) settle to the bottom of the first compartment 152 and the water and contaminates that have a lower specific gravity than water (e.g., remaining oils, plastics) flow over the weir 153 and into the second compartment 154. In the second compartment, contaminates that have a lower specific gravity than water tend to float to the top of the second compartment 156 while the, now, reclaimed water exits from the bottom of the second compartment 154 under a partition 157 (e.g., an inverted weir 157) and into an exit compartment 158, where the reclaimed water exits, for example, into the sewerage drain 200. As with the plate layers 30/40, after some number of uses, debris, sand, contaminates are vacuumed out of the compartments 152/154/158 and disposed or recycled according to accepted practices.

In FIG. 4, the reclaimed water is not recycled, entering the sewerage system 200 or any other known waste water disposal system (not shown). In such, fresh water is supplied for cleaning the vehicle 5, for example, from a municipal water supply 110 or well and pump 110.

In FIG. 5, the reclaimed water exiting the separation tank 150 is gravity fed to a sump 302 through line 300. When the sump 302 fills to a certain point, the reclaimed water from within the sump 302 is pumped out through an exit pipe 306 and is directed by a valve 304 to either the sewerage system 200 (or other drainage system 200) or into filtering and separation tanks 310/320. The reclaimed water in the first separation tank 310 is preferably treated with aeration from an air pump 312. As the first separation tank 310 approaches being filled with the reclaimed water, some of the reclaimed water exits the first separation tank 310 from an upper area to exclude some amount of sedimentation, and this water passes through a filter 316, for example, a paper filter, sand filter, carbon filter, etc. The now, substantially clean water enters the second separation tank 320 which optionally has a second aeration pump 322. Should the system lose water (fluid) due to, for example, splashing, evaporation, and some water remaining on the vehicle 5, additional water is added from, for example, a water supply 110 through a valve 324 that is used to control the amount of water that is added to the system.

Water (substantially clean water) is then drawn from the bottom of the second separation tank 320. By drawing the water from the bottom of the second separation tank 320, the second separation tank 320 serves as a reservoir, in that, the system will operate and not need refilling from the water supply 110 until the second separation tank 320 is substantially depleted. This requires fewer operations to add water from the supply. In some embodiments (not shown), the supply valve 324 is automatically operated when an electronic device (e.g. a float or other device) determines that the water level in the second separation tank 320 is below a certain level.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A waste water and hazardous chemical containment and collection system comprising:
   a substantially planar, lower layer, the planar, lower layer being non-porous except for a drain;
   a lower plate layer resting upon the planar lower layer, the lower plate layer comprising geo-membranes arranged in a grid;
   an upper plate layer resting upon the lower plate layer, the upper plate layer comprising the geo-membranes such that the grid of the upper plate layer is offset at an angle with respect to the grid of the lower plate layer; and
   an upper layer having a plurality of holes for the passage of fluids;
   wherein the overall length and width of the lower plate layer, the upper plate layer, and the upper layer are substantially equal;
   the lower plate layer and the upper plate layer are configured such that the fluids enter the waste water and hazardous chemical containment and collection system through the plurality of holes, the fluids traverse the grid of the lower plate layer and the grid of the upper plate layer flowing towards the drain and as the fluids traverse the grid of the lower plate layer and the grid of the upper plate layer some oils from the fluids collect within the grid of the lower plate layer and the grid of the upper plate layer.

2. The waste water and hazardous chemical containment and collection system of claim 1, in which the fluids comprise water with pollutants and oils that enters through the plurality of holes in the upper layer, at least some of the oils are trapped in the upper and lower plate layers and the water, pollutants and remaining oils exit through the drain.

3. The waste water and hazardous chemical containment and collection system of claim 2, further comprising a separation tank fluidly connected to the drain, the separation tank further removing some of the pollutants and some of the remaining oils that have higher or lower specific gravities than the water through a weir system.

4. The waste water and hazardous chemical containment and collection system of claim 1, further comprising walls surrounding the lower plate layer, the upper plate layer and the upper layer.

5. The waste water and hazardous chemical containment and collection system of claim 1, wherein the lower plate layer and the upper plate layer are textured geo-membranes made by co-extruding textured, high density polyethylene.

6. The waste water and hazardous chemical containment and collection system of claim 1, wherein the substantially planar lower layer is a layer of reinforced polypropylene.

7. A waste water and hazardous chemical containment and collection system comprising:
   a substantially planar, lower layer, the planar lower layer being non-porous except for a drain;
   a lower plate layer resting upon the planar lower layer, the lower plate layer comprising geo-membranes arranged in a grid;
   an upper plate layer resting upon the lower plate layer, the upper plate layer comprising the geo-membranes such that the grid of the upper plate layer is offset at an angle with respect to the grid of the lower plate layer;
   an upper layer having a plurality of holes for the passage of fluids; and
   walls surrounding the lower plate layer, the upper plate layer, and the upper layer.

8. The waste water and hazardous chemical containment and collection system of claim 7, wherein the lower plate layer and the upper plate layer are textured geo-membranes made by co-extruding textured, high density polyethylene.

9. The waste water and hazardous chemical containment and collection system of claim 7, wherein the substantially planar lower layer is a layer of reinforced polypropylene.

10. The waste water and hazardous chemical containment and collection system of claim 7, further comprising a separation tank that receives a water, remaining oils, and pollutants from the drain and further removes some of the pollutants and some of the remaining oils that have higher or lower specific gravities than the water through a weir system.

* * * * *